United States Patent
Cui et al.

(10) Patent No.: US 11,929,871 B2
(45) Date of Patent: Mar. 12, 2024

(54) METHOD FOR GENERATING BACKBONE NETWORK, APPARATUS FOR GENERATING BACKBONE NETWORK, DEVICE, AND STORAGE MEDIUM

(71) Applicant: Beijing Baidu Netcom Science Technology Co., Ltd., Beijing (CN)

(72) Inventors: Cheng Cui, Beijing (CN); Tingquan Gao, Beijing (CN); Shengyu Wei, Beijing (CN); Yuning Du, Beijing (CN); Ruoyu Guo, Beijing (CN); Bin Lu, Beijing (CN); Ying Zhou, Beijing (CN); Xueying Lyu, Beijing (CN); Qiwen Liu, Beijing (CN); Xiaoguang Hu, Beijing (CN); Dianhai Yu, Beijing (CN); Yanjun Ma, Beijing (CN)

( * ) Notice: Subject to any disclaimer, the term of this patent is extended or adjusted under 35 U.S.C. 154(b) by 0 days.

(21) Appl. No.: 17/718,149

(22) Filed: Apr. 11, 2022

(65) Prior Publication Data
US 2022/0247626 A1   Aug. 4, 2022

(30) Foreign Application Priority Data
Sep. 16, 2021   (CN) .......................... 202111088473.8

(51) Int. Cl.
*G06K 9/62*   (2022.01)
*G06F 18/214*   (2023.01)
(Continued)

(52) U.S. Cl.
CPC ........ *H04L 41/0806* (2013.01); *G06F 18/214* (2023.01); *H04L 41/0846* (2013.01); *H04L 41/0894* (2022.05)

(58) Field of Classification Search
CPC ............. H04L 41/0806; H04L 41/0894; H04L 41/0846; G06F 18/214
See application file for complete search history.

(56) References Cited

U.S. PATENT DOCUMENTS

| 2019/0354837 A1 | 11/2019 | Zhou et al. |
| 2021/0125030 A1* | 4/2021 | Lazaro-Gredilla .... G06N 5/022 |
| 2021/0264261 A1* | 8/2021 | Staudinger ............. G06N 3/044 |

FOREIGN PATENT DOCUMENTS

| CN | 111192294 A | * | 5/2020 | ........... G06K 9/4676 |
| CN | 111582372 A | * | 8/2020 | |

(Continued)

OTHER PUBLICATIONS

Howard et al., "Searching for MobileNetV3," IEEE/CVF International Conference on Computer Vision (ICCV), dated 2019, pp. 1314-1324.
(Continued)

*Primary Examiner* — Christopher B Robinson
(74) *Attorney, Agent, or Firm* — Knobbe, Martens, Olson & Bear LLP

(57) ABSTRACT

The present disclosure provides a method for generating a backbone network, an apparatus for generating a backbone network, a device, and a storage medium. The method includes: acquiring a set of a training image, a set of an inference image, and a set of an initial backbone network; training and inferring, for each initial backbone network in the set of the initial backbone network, the initial backbone network by using the set of the training image and the set of the inference image, to obtain an inference time and an inference accuracy of a trained backbone network in an inference process; determining a basic backbone network based on the inference time and the inference accuracy of the trained backbone network in the inference process; and obtaining a target backbone network based on the basic backbone network and a preset target network.

18 Claims, 6 Drawing Sheets

(51) Int. Cl.
*H04L 41/0806* (2022.01)
*H04L 41/084* (2022.01)
*H04L 41/0894* (2022.01)

(56) References Cited

FOREIGN PATENT DOCUMENTS

| | | | | |
|---|---|---|---|---|
| CN | 111626349 A | | 9/2020 | |
| CN | 111626407 A | * | 9/2020 | ........... G06N 3/0454 |
| CN | 111797983 A | | 10/2020 | |
| CN | 111950702 A | * | 11/2020 | |
| CN | 112288772 A | * | 1/2021 | ............. G06T 7/248 |
| CN | 112308822 A | | 2/2021 | |
| CN | 112446379 A | * | 3/2021 | |
| WO | 2020081470 A1 | | 4/2020 | |
| WO | WO-2021238366 A1 | * | 12/2021 | ........... G06K 9/6256 |

OTHER PUBLICATIONS

Tan et al., "MnasNet: Platform-Aware Neural Architecture Search for Mobile," IEEE/CVF Conference on Computer Vision and Pattern Recognition (CVPR), dated 2019, pp. 2815-2823.

Wang, Suyu et al., "Retinal Microvascular Segmentation Algorithm Based on Attention Mechanism and Dense Convolution," Journal of Beijing University of Technology, vol. 47, No. 5, May 2021, in 8 pages.

* cited by examiner

METHOD FOR GENERATING BACKBONE NETWORK, APPARATUS FOR GENERATING BACKBONE NETWORK, DEVICE, AND STORAGE MEDIUM

CROSS-REFERENCE TO RELATED APPLICATIONS

The present application claims the priority of Chinese Patent Application No. 202111088473.8, titled "METHOD FOR GENERATING BACKBONE NETWORK, APPARATUS FOR GENERATING BACKBONE NETWORK, DEVICE, AND STORAGE MEDIUM", filed on Sep. 16, 2021, the content of which is incorporated herein by reference in its entirety.

TECHNICAL FIELD

The present disclosure relates to the technical field of artificial intelligence, specifically relates to the technologies of deep learning and computer vision, and more specifically relates to a method for generating a backbone network, an apparatus for generating a backbone network, a device, and a storage medium.

BACKGROUND

Deep learning-based computer vision tasks, such as image classification, target detection, image semantic segmentation, and metric learning, are inseparable from backbone networks. As feature extractors, the importance of the backbone networks is self-evident. Some existing lightweight backbone networks, such as SHuffleNetV2 and MobileNetV3, are still not ideal for inference time on an Intel CPU (Intel central processing unit), thereby resulting in failure in real-time predictions of tasks such as target detection and image segmentation on the Intel CPU.

SUMMARY

The present disclosure provides a method for generating a backbone network, an apparatus for generating a backbone network, a device, and a storage medium.

According to a first aspect of the present disclosure, a method for generating a backbone network is provided, including: acquiring a set of a training image, a set of an inference image, and a set of an initial backbone network; training and inferring, for each initial backbone network in the set of the initial backbone network, the initial backbone network by using the set of the training image and the set of the inference image, to obtain an inference time and an inference accuracy of a trained backbone network in an inference process; determining a basic backbone network based on the inference time and the inference accuracy of the trained backbone network in the inference process; and obtaining a target backbone network based on the basic backbone network and a preset target network.

According to a second aspect of the present disclosure, an electronic device is provided, including: at least one processor; and a memory communicatively connected to the at least one processor; where the memory stores instructions executable by the at least one processor, and the instructions, when executed by the at least one processor, cause the at least one processor to execute the method as described in any one implementation of the first aspect.

According to a third aspect of the present disclosure, a non-transitory computer readable storage medium storing computer instructions is provided, where the computer instructions cause a computer to execute the method as described in any one implementation of the first aspect.

It should be understood that contents described in the SUMMARY are neither intended to identify key or important features of embodiments of the present disclosure, nor intended to limit the scope of the present disclosure. Other features of the present disclosure will become readily understood in conjunction with the following description.

BRIEF DESCRIPTION OF THE DRAWINGS

The accompanying drawings are used for better understanding of the present solution, and do not impose any limitation on the present disclosure. In the accompanying drawings.

DETAILED DESCRIPTION OF EMBODIMENTS

Example embodiments of the present disclosure are described below with reference to the accompanying drawings, including various details of the embodiments of the present disclosure to contribute to understanding, which should be considered merely as examples. Therefore, those of ordinary skills in the art should realize that various alterations and modifications can be made to the embodiments described here without departing from the scope and spirit of the present disclosure. Similarly, for clearness and conciseness, descriptions of well-known functions and structures are omitted in the following description.

It should be noted that the embodiments in the present disclosure and the features in the embodiments may be combined with each other on a non-conflict basis. Some embodiments of the present disclosure will be described in detail below with reference to the accompanying drawings and in combination with the embodiments.

Figure 1:
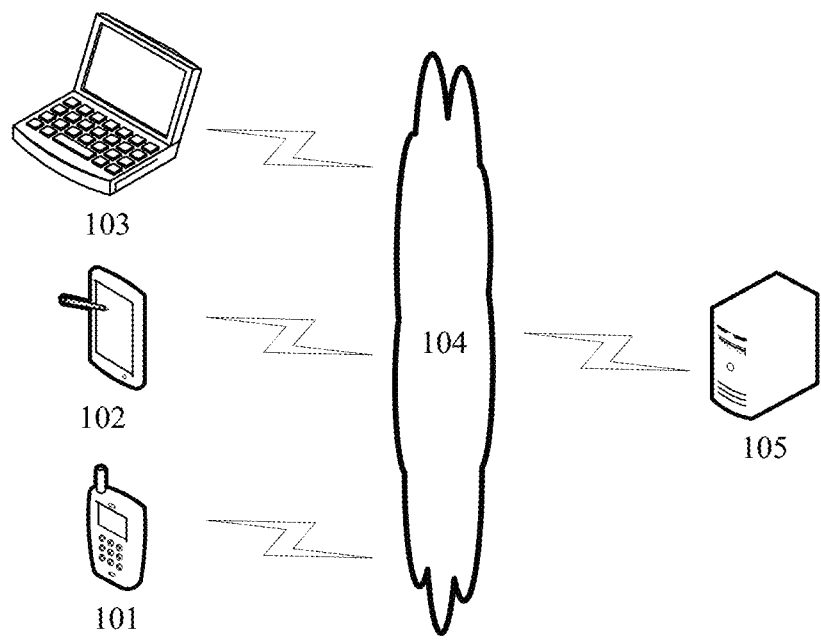
FIG. 1 is a diagram of an example system architecture in which embodiments of the present disclosure may be implemented.

FIG. 1 shows an example system architecture 100 in which a method for generating a backbone network or an apparatus for generating a backbone network of embodiments of the present disclosure may be implemented.

As shown in FIG. 1, the system architecture 100 may include terminal devices 101, 102, and 103, a network 104, and a server 105. The network 104 serves as a medium providing a communication link between the terminal devices 101, 102, and 103, and the server 105. The network 104 may include various types of connections, such as wired or wireless communication links, or optical cables.

A user may interact with the server 105 by using the terminal devices 101, 102, and 103 via the network 104, for example, to receive or send information. The terminal devices 101, 102, and 103 may be provided with various client applications, The terminal devices 101, 102, and 103 may be hardware, or may be software. When the terminal devices 101, 102, and 103 are hardware, the terminal devices may be various electronic devices, including but not limited to a smart phone, a tablet computer, a laptop portable computer, a desktop computer, and the like. When the terminal devices 101, 102, and 103 are software, the terminal devices may be installed in the above electronic devices, or may be implemented as a plurality of software programs or software modules, or may be implemented as a single software program or software module. This is not specifically limited here.

The server 105 may provide various services. For example, the server 105 may analyze and process a set of a training image, a set of an inference image, and a set of an initial backbone network acquired from the terminal devices 101, 102, and 103, and generate a processing result (e.g., a target backbone network).

It should be noted that the server 105 may be hardware, or may be software. When the server 105 is hardware, the server may be implemented as a distributed server cluster composed of a plurality of servers, or may be implemented as a single server. When the server 105 is software, the server may be implemented as a plurality of software programs or software modules (e.g., software programs or software modules for providing distributed services), or may be implemented as a single software program or software module. This is not specifically limited here.

It should be noted that the method for generating a backbone network provided in embodiments of the present disclosure is generally executed by the server 105. Accordingly, the apparatus for generating a backbone network is generally provided in the server 105.

It should be understood that the numbers of terminal devices, networks, and servers in FIG. 1 are merely illustrative. Any number of terminal devices, networks, and servers may be provided based on actual requirements.

Figure 2:
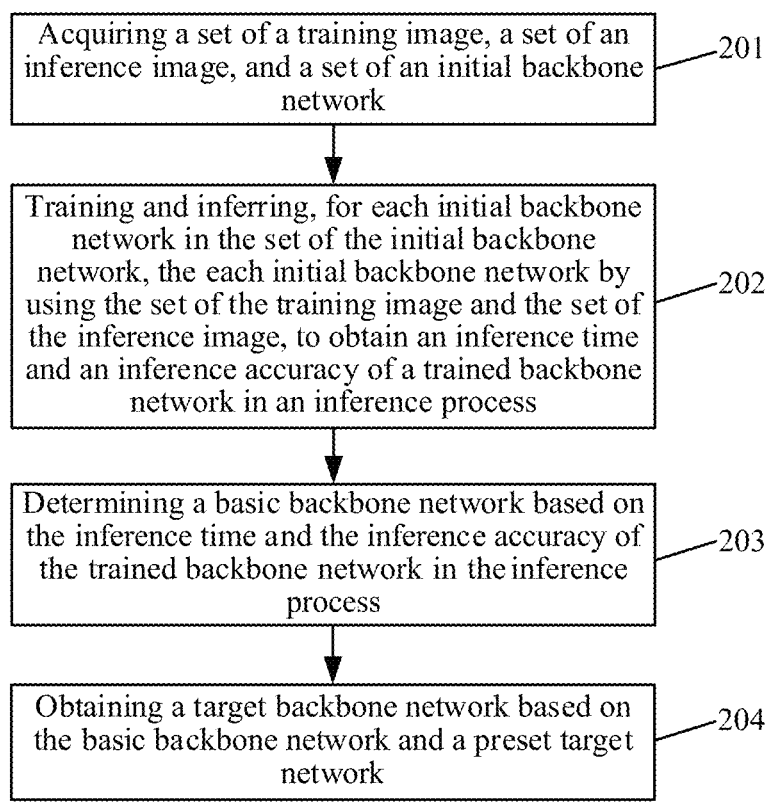
FIG. 2 is a flowchart of a method for generating a backbone network according to an embodiment of the present disclosure.

Further referring to FIG. 2, a process 200 of a method for generating a backbone network according to an embodiment of the present disclosure is shown. The method for generating a backbone network includes the following steps:

Step 201: acquiring a set of a training image, a set of an inference image, and a set of an initial backbone network.

In the present embodiment, an executing body (e.g., the server 105 shown in FIG. 1) of the method for generating a backbone network may acquire the set of the training image, the set of the inference image, and the set of the initial backbone network. The set of the training image is used for training an initial backbone network in the set of the initial backbone network, and the set of the training image includes at least one image. The set of the training image may be an existing image set, such as an ImageNet-1k image data set, or may be an image set collected from existing images and including a certain number of images. This is not specifically limited in the present embodiment. The set of the inference image includes at least one image, and the trained backbone network may infer an inference image in the set of the inference image. Further, the set of the initial backbone network includes at least one initial backbone network, and the initial backbone network may be an existing backbone network or a backbone network obtained by training. This is not specifically limited in the present embodiment.

Step 202: training and inferring, for each initial backbone network in the set of the initial backbone network, the initial backbone network by using the set of the training image and the set of the inference image, to obtain an inference time and an inference accuracy of a trained backbone network in an inference process.

In the present embodiment, for each initial backbone network in the set of the initial backbone network acquired in step 201, the executing body may train and infer the initial backbone network by using the set of the training image and the set of the inference image acquired in step 201, to obtain the inference time and the inference accuracy of the trained backbone network in the inference process.

For example, the executing body may train the initial backbone network by using the set of the training image to obtain the trained backbone network; and then infer the inference image in the set of the inference image by using the trained backbone network, to obtain the inference time and the inference accuracy of the trained backbone network in the inference process. Since the set of the inference image may include at least one image, when the set of the inference image includes only one image, the executing body may use the time used for inferring the above image by using the trained backbone network as the inference time of the trained backbone network in the inference process, and may use the inference result accuracy as the inference accuracy of the trained backbone network in the inference process. When the set of the inference image includes a plurality of images, the executing body may record a time used for inference each of the above images by using the trained backbone network and an inference result accuracy, then may average inference times of all images and inference accuracies of all images respectively, and may use the average results as the inference time and the inference accuracy of the trained backbone network in the inference process.

Alternatively, since the above inference process runs on an Intel CPU, MKLDNN (Math Kernel Library for Deep Neural Networks) may be enabled in the inference process, thereby improving the inference speed of the backbone network on the Intel CPU.

Step 203: determining a basic backbone network based on the inference time and the inference accuracy of the trained backbone network in the inference process.

In the present embodiment, the executing body may determine the basic backbone network based on the inference time and the inference accuracy of the trained backbone network in the inference process, where the basic backbone network is a backbone network with low inference time and high inference accuracy among the above trained backbone network, i.e., a backbone network with best effects in the set of the initial backbone network.

After step 202, the inference time and the inference accuracy of the trained backbone network corresponding to each initial backbone network in the set of the initial backbone network in the inference process may be obtained. It is understandable that a backbone network with a less inference time and a higher inference accuracy is better, or when backbone networks have the same inference time, a backbone network with a higher inference accuracy is better, or when backbone networks have the same inference accuracy, a backbone network with a less inference time is better. Therefore, the executing body may determine the basic backbone network based on the above rules. However, when both the inference times and the inference accuracies of different backbone networks are different, the basic backbone network may be determined based on a corresponding proportional relationship between inference times and the inference accuracies.

Alternatively, after determining the basic backbone network, the executing body may find a design rule corresponding to the basic backbone network, determine other backbone networks similar in structure to the basic backbone network based on the design rule, and repeatedly execute steps 202 to 203, thereby obtaining inference times and inference accuracies corresponding to the other backbone networks, determining a backbone network with better effects based on the inference times and the inference accuracies, and using the determined backbone network with the better effects as the basic backbone network.

Step 204: obtaining a target backbone network based on the basic backbone network and a preset target network.

In the present embodiment, the executing body may obtain the target backbone network based on the basic backbone network obtained in step 203 and the preset target network. The preset target network is a pre-established network that may further improve the inference accuracy of the basic backbone network but will hardly affect the inference time of the basic backbone network. For example, the target network may include a larger fully connected layer, or a more powerful activation function.

The basic backbone network obtained in step 203 already has an excellent ability to perform balance between an inference time and an inference accuracy. Therefore, in this step, the executing body may acquire the preset target network and add the target network to the basic backbone network obtained in step 203, to obtain the target backbone network, so that the inference accuracy of the target backbone network may be further improved.

The method for generating a backbone network provided in embodiments of the present disclosure first acquires a set of a training image, a set of an inference image, and a set of an initial backbone network; then trains and infers, for each initial backbone network in the set of the initial backbone network, the initial backbone network by using the set of the training image and the set of the inference image, to obtain an inference time and an inference accuracy of a trained backbone network in an inference process; then determines a basic backbone network based on the inference time and the inference accuracy of the trained backbone network in the inference process; and finally obtains a target backbone network based on the basic backbone network and a preset target network. The method for generating a backbone network in the present embodiment is based on an Intel CPU, such that the target backbone network obtained in accordance with the method in the present embodiment has a higher inference accuracy and a faster inference speed on the Intel CPU; and in addition, the target backbone network obtained based on the method in the present embodiment has low migration costs, thus more facilitating to migration.

In the technical solutions of the present disclosure, the collection, storage, use, processing, transmission, provision, and disclosure of involved user personal information are in conformity with relevant laws and regulations, and do not violate public order and good customs.

Figure 3:
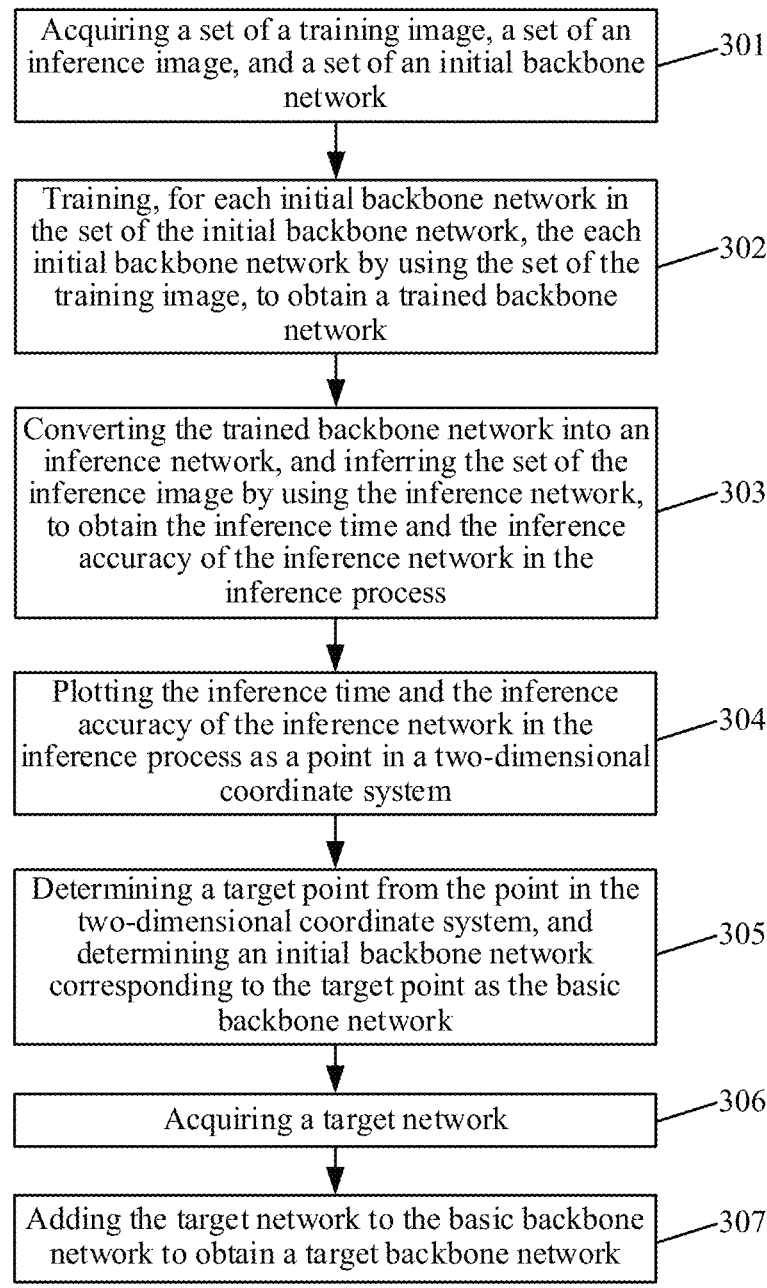
FIG. 3 is a flowchart of the method for generating a backbone network according to another embodiment of the present disclosure.

Further referring to FIG. 3, FIG. 3 shows a process 300 of the method for generating a backbone network according to another embodiment of the present disclosure. The method for generating a backbone network includes the following steps:

Step 301: acquiring a set of a training image, a set of an inference image, and a set of an initial backbone network.

In the present embodiment, an executing body (e.g., the server 105 shown in FIG. 1) of the method for generating a backbone network may acquire the set of the training image, the set of the inference image, and the set of the initial backbone network. Step 301 is substantially consistent with step 201 in the above embodiments, and the above description of step 201 may be referred to for specific implementations of this step. The description will not be repeated here.

In some alternative implementations of the present embodiment, the set of the initial backbone network includes at least one initial backbone network; and the initial backbone network is obtained through the following steps of: acquiring a network block of a lightweight backbone network to obtain a set of the network block; and randomly combining the network block in the set of the network block to obtain the initial backbone network.

In the present implementation, the network block in the lightweight backbone network may be first acquired, thereby obtaining the set of the network block including at least one block. For example, the set of the network block may include one or more of the following items: DepthSepConv (Depthwise Separable Convolution) block, Channel-Shuffle block, Inverted residual block, Ghost block, and Fire block, where the DepthSepConv is a block used by a backbone network MobileNetV1, the Channel-Shuffle block is a block used by a backbone network ShuffleNetV1/V2, the Inverted residual block is a block used by a backbone network MobileNetV2/V3, the Ghost block is a block used by a backbone network GhostNet, and the Fire block is a block used by a backbone network SqueezeNet.

Then, the executing body may randomly combine the network block in the set of the network block, thereby obtaining at least one combined initial backbone network. The at least one initial backbone network constitutes the set of the initial backbone network. Network blocks in the set of the network block are randomly combined, such that the structures of the obtained initial backbone networks are not limited to a certain structure, thereby enriching the structures of the initial backbone networks.

It should be noted that any two network blocks in the set of the network block may be combined, or any three network blocks in the set of the network block may be combined. The number of blocks used in the random combination is not limited in the present embodiment.

Step 302: training, for each initial backbone network in the set of the initial backbone network, the initial backbone network by using the set of the training image, to obtain a trained backbone network.

In the present embodiment, for each initial backbone network in the set of the initial backbone network, the executing body (e.g., the server 105 shown in FIG. 1) of the method for generating a backbone network may train the initial backbone network by using the set of the training image acquired in step 301, to obtain the trained backbone network. Preferably, the executing body trains the initial backbone network by using an ImageNet-1k image data set to obtain the trained backbone network.

Step 303: converting the trained backbone network into an inference network, and inferring the set of the inference image by using the inference network, to obtain an inference time and an inference accuracy of the inference network in the inference process.

In the present embodiment, the executing body may convert the backbone network trained in step 302 into the inference network, and the specific conversion process may be implemented by using an existing technology. The description will not be repeated here. Then, the executing body may refer the set of the inference image by using the obtained inference network, to obtain the inference time and the inference accuracy when the inference network infers each image in the set of the inference image, then average the inference times and the inference accuracies of all images, and uses the average results as the inference time and the inference accuracy of the inference network in the inference process. Therefore, the inference time and the inference accuracy corresponding to the inference network can better represent the average level of the inference times and the inference accuracies of the inference network in the inference process.

Step 304: plotting the inference time and the inference accuracy of the inference network in the inference process as a point in a two-dimensional coordinate system.

In the present embodiment, by taking inference times as the abscissae and inference accuracies as the ordinates, the executing body may plot the inference time and the inference accuracy of each inference network in the inference process as a point in the two-dimensional coordinate system, so that the two-dimensional coordinate system including the point of the inference time and the inference accuracy corresponding to each inference network is obtained.

Step 305: determining a target point from the point in the two-dimensional coordinate system, and determining an initial backbone network corresponding to the target point as the basic backbone network.

In the present embodiment, the executing body may determine a target point from points in the two-dimensional coordinate system, and determine an initial backbone network corresponding to the target point as the basic backbone network. It is understandable that an initial backbone network corresponding to a point closer to the upper left in the two-dimensional coordinate system has a less inference time and a higher inference accuracy. Therefore, the closer a point is to the upper left, the better an initial backbone network corresponding to the point is. Therefore, in the present embodiment, the point closer to the upper left in the two-dimensional coordinate system may be used as the target point, and then the initial backbone network corresponding to the target point may be determined as the basic backbone network, so that the obtained basic backbone network has a higher inference accuracy and a shorter inference time.

Step 306: acquiring a target network.

In the present embodiment, the executing body may acquire the target network, where the target network is a pre-established network that may further improve the inference accuracy of the basic backbone network but will hardly affect the inference time of the basic backbone network. The target network includes at least one of the following items: an activation function and a fully connected layer. As an example, the activation function may be an h-swish activation function, which is a more powerful activation function with better effects. Alternatively, a larger fully connected layer may be used.

Step 307: adding the target network to the basic backbone network to obtain a target backbone network.

In the present embodiment, the executing body may add the target network acquired in step 306 to the basic backbone network to obtain the target backbone network. For example, the executing body may add the target network including the larger fully connected layer to the end of the basic backbone network to obtain the target backbone network, thereby further improving the inference accuracy of the target backbone network under the premise of guaranteeing the inference time of the target backbone network.

As can be seen from FIG. 3, compared with the corresponding embodiment of FIG. 2, the method for generating a backbone network in the present embodiment first acquires a set of a training image, a set of an inference image, and a set of an initial backbone network, and trains, for each initial backbone network in the set of the initial backbone network, the initial backbone network by using the set of the training image, to obtain a trained backbone network; then converts the trained backbone network into an inference network, and refers the set of the inference image by using the inference network, to obtain an inference time and an inference accuracy of the inference network in an inference process; then plots the inference time and the inference accuracy of the inference network in the inference process as a point in a two-dimensional coordinate system, determines a target point from the point in the two-dimensional coordinate system, and determines an initial backbone network corresponding to the target point as a basic backbone network; and finally acquires a target network, and adds the target network to the basic backbone network to obtain a target backbone network. The method for generating a backbone network in the present embodiment further improves the inference accuracy of the target backbone network on the basis of guaranteeing the inference time of the target backbone network on an Intel CPU.

Figure 4:
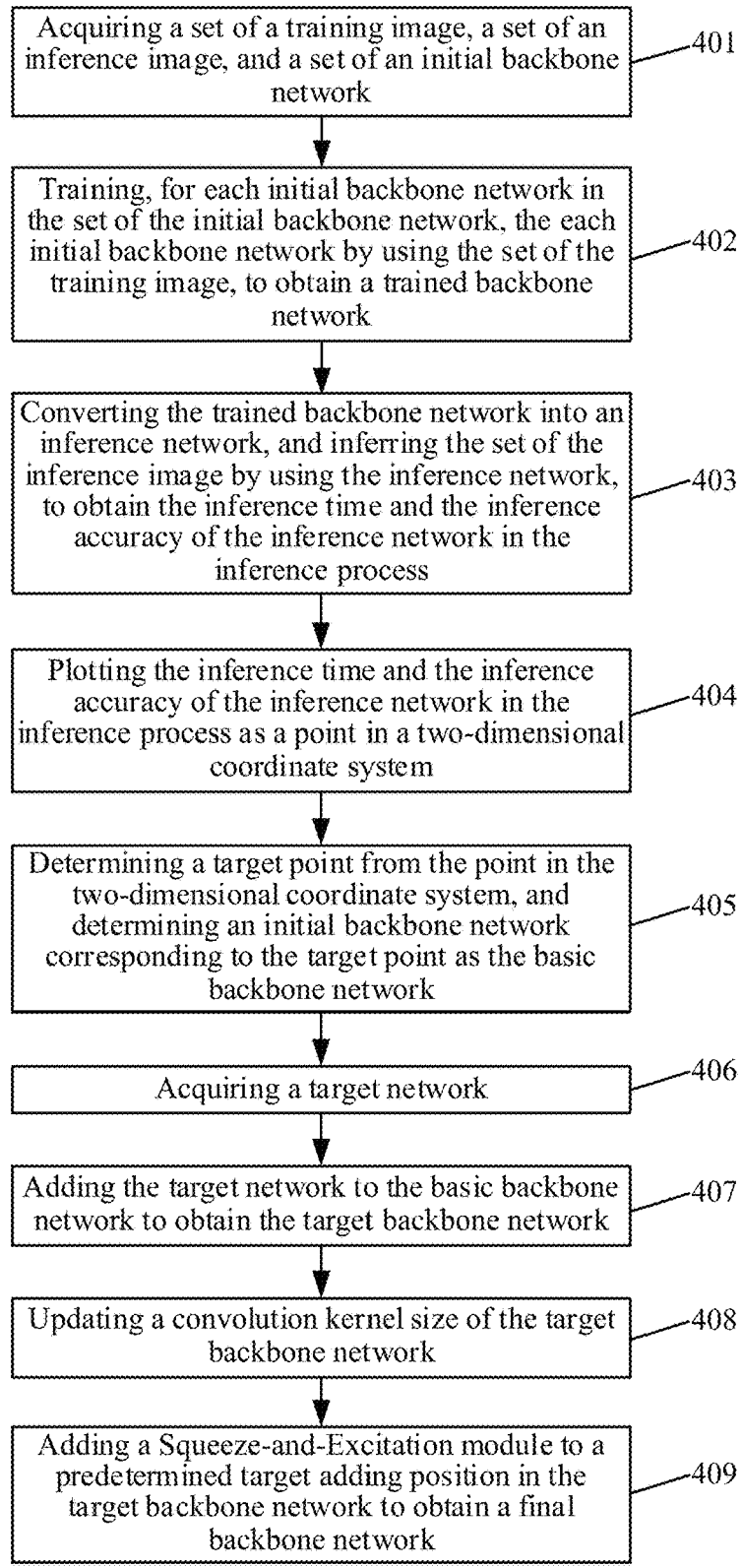
FIG. 4 is a flowchart of the method for generating a backbone network according to still another embodiment of the present disclosure.

Further referring to FIG. 4, FIG. 4 shows a process 400 of the method for generating a backbone network according to still another embodiment of the present disclosure. The method for generating a backbone network includes the following steps:

Step 401: acquiring a set of a training image, a set of an inference image, and a set of an initial backbone network.

Step 402: training, for each initial backbone network in the set of the initial backbone network, the initial backbone network by using the set of the training image, to obtain a trained backbone network.

Step 403: converting the trained backbone network into an inference network, and inferring the set of the inference image by using the inference network, to obtain an inference time and an inference accuracy of the inference network in an inference process.

Step 404: plotting the inference time and the inference accuracy of the inference network in the inference process as a point in a two-dimensional coordinate system.

Step 405: determining a target point from the point in the two-dimensional coordinate system, and determining an initial backbone network corresponding to the target point as the basic backbone network.

Step 406: acquiring a target network.

Step 407: adding the target network to the basic backbone network to obtain the target backbone network.

Steps 401 to 407 are substantially consistent with steps 301 to 307 in the above embodiments, and the above description of steps 301 to 307 may be referred to for specific implementations of these steps. The description will not be repeated here.

Step 408: updating a convolution kernel size of the target backbone network.

In the present embodiment, an executing body (e.g., the server 105 shown in FIG. 1) of the method for generating a backbone network may update the convolution kernel size of the target backbone network, i.e., change the convolution kernel size of the target backbone network to a preset size larger than a current convolution kernel size, where the preset size may be set based on specific circumstances. This is not limited in the present embodiment. The convolution kernel size of the target backbone network is updated, thereby further improving the inference accuracy of the target backbone network.

Step 409: adding a Squeeze-and-Excitation module to a predetermined target adding position in the target backbone network to obtain a final backbone network.

In the present embodiment, the executing body may add the SE module (Squeeze-and-Excitation Networks) to a predetermined target adding position in the target backbone network to obtain a final backbone network. The SE module learns a correlation between channels, and filters out attention for the channels, thereby further improving the accuracy of a network model. Further, the SE module may be loaded into an existing network model framework. In the present embodiment, the SE module is loaded into the target backbone network obtained in step 408 to obtain the final backbone network, thereby further improving the inference accuracy of the final backbone network.

In some alternative implementations of the present embodiment, the target adding position is determined through the following steps of: adding the SE module to different positions in the target backbone network to obtain a corresponding set of first backbone networks; inferring, for each first backbone network in the set of the first backbone networks, the set of the inference image by using each first backbone network, to obtain an inference time and an inference accuracy of each first backbone network in the inference process; and determining the target adding position based on the inference time and the inference accuracy of each first backbone network in the inference process.

In the present implementation, the SE module is first added to different positions in the target backbone network to obtain a plurality of corresponding first backbone networks, which constitutes the set of the first backbone networks. Then, for each first backbone network in the set of the first backbone networks, an inference image in the set of the inference image is inferred by using a first backbone network, to obtain the inference time and the inference accuracy of the first backbone network in the inference process. Finally, a first backbone network with best effects is determined based on the inference time and the inference accuracy of each first backbone network in the inference process, and the above embodiments may be referred to for specific determining process. The description will not be repeated here. The adding position of the SE module in the optimal first backbone network is the target adding position. The target adding position of the SE module is determined based on the inference time and the inference accuracy of each first backbone network in the inference process, thereby improving the inference accuracy of the final backbone network with the added SE module.

As can be seen from FIG. 4, compared with the corresponding embodiment of FIG. 3, the method for generating a backbone network in the present embodiment highlights the steps of updating the convolution kernel size of the target backbone network and adding the SE module to the target backbone network, to obtain the final backbone network, thereby further improving the inference accuracy of the final backbone network.

Figure 5:
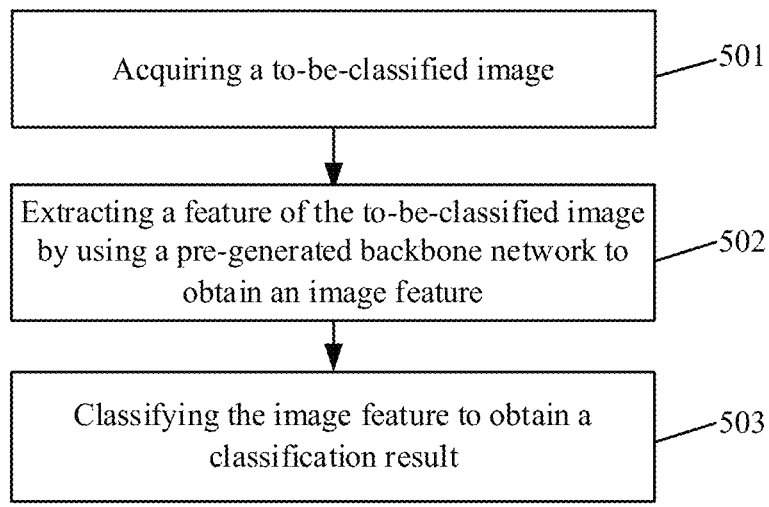
FIG. 5 is a flowchart of a method for classifying an image according to an embodiment of the present disclosure.

Further referring to FIG. 5, a process 500 of a method for classifying an image according to an embodiment of the present disclosure is shown. The method for classifying an image includes the following steps:

Step 501: acquiring a to-be-classified image.

In the present embodiment, an executing body of the method for classifying an image (e.g., the server 105 shown in FIG. 1) may acquire the to-be-classified image, where the to-be-classified image may be selected and uploaded by a user from existing images, or may be taken by a user by using a camera of a terminal device. The to-be-classified image may be an image containing any person or thing. This is not specifically limited in the present embodiment.

Step 502: extracting a feature of the to-be-classified image by using a pre-generated backbone network to obtain an image feature.

In the present embodiment, the executing body may extract the feature of the to-be-classified image by using a pre-trained backbone network to obtain the image feature, where the backbone network may be obtained by the method according to the above embodiments. Specifically, the executing body may input the to-be-classified image acquired in step 501 into a pre-generated backbone network, so that the backbone network extracts the feature of the to-be-classified image, thereby obtaining the image feature corresponding to the to-be-classified image.

Step 503: classifying the image feature to obtain a classification result.

In the present embodiment, the executing body may classify the image feature obtained in step 502 to obtain a final classification result. Specifically, the executing body may assign, based on an image feature of each dimension extracted by the backbone network, a classification label to the image feature of each dimension, and obtain the final classification result based on each classification label.

The method for classifying an image provided in the embodiments of the present disclosure first acquires a to-be-classified image; then extracts a feature of the to-be-classified image by using a pre-trained backbone network to obtain an image feature; and finally classifies the image feature to obtain a classification result. The method for classifying an image in the present embodiment extracts a feature of a to-be-classified image by using a pre-generated backbone network, thereby improving the speed and accuracy of extracting the feature, and further improving the accuracy of a final classification result.

Figure 6:
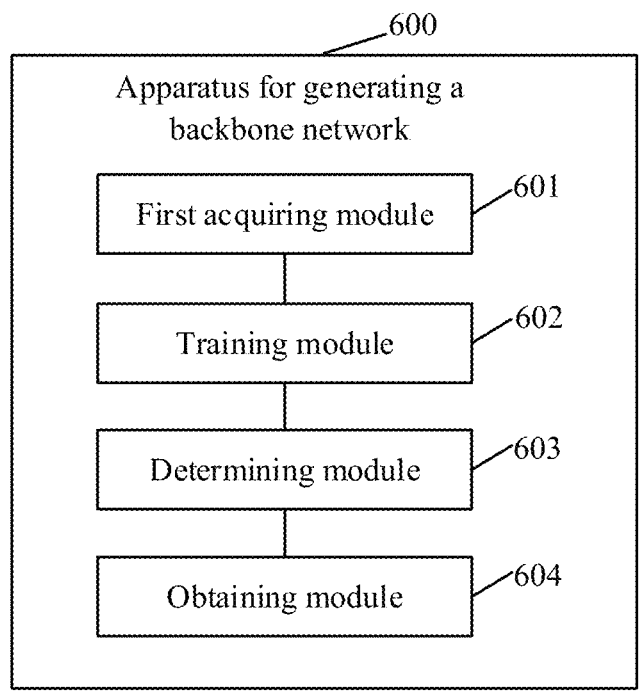
FIG. 6 is a schematic structural diagram of an apparatus for generating a backbone network according to an embodiment of the present disclosure.

Further referring to FIG. 6, as an implementation of the method shown in the above figures, an embodiment of the present disclosure provides an apparatus for generating a backbone network. The embodiment of the apparatus corresponds to the embodiment of the method shown in FIG. 2, and the apparatus may be specifically applied to various electronic devices.

As shown in FIG. 6, the apparatus 600 for generating a backbone network in the present embodiment includes: a first acquiring module 601, a training module 602, a determining module 603, and an obtaining module 604. The first acquiring module 601 is configured to acquire a set of a training image, a set of an inference image, and a set of an initial backbone network; the training module 602 is configured to train and infer, for each initial backbone network in the set of the initial backbone network, the initial backbone network by using the set of the training image and the set of the inference image, to obtain an inference time and an inference accuracy of a trained backbone network in an inference process; the determining module 603 is configured to determine a basic backbone network based on the inference time and the inference accuracy of the trained backbone network in the inference process; and the obtaining module 604 is configured to obtain a target backbone network based on the basic backbone network and a preset target network.

The related description of steps 201 to 204 in the corresponding embodiment of FIG. 2 may be referred to for specific processing of the first acquiring module 601, the training module 602, the determining module 603, and the obtaining module 604 of the apparatus 600 for generating a backbone network in the present embodiment and the technical effects thereof, respectively. The description will not be repeated here.

In some alternative implementations of the present embodiment, the training module includes: a training submodule configured to train the initial backbone network by using the set of the training image to obtain the trained backbone network; and an inference submodule configured to convert the trained backbone network into an inference network, and refer the set of the inference image by using the inference network, to obtain the inference time and the inference accuracy of the inference network in the inference process.

In some alternative implementations of the present embodiment, the determining module includes: a plotting submodule configured to plot the inference time and the inference accuracy of the inference network in the inference process as a point in a two-dimensional coordinate system; and a determining submodule configured to determine a target point from the point in the two-dimensional coordinate system, and determine an initial backbone network corresponding to the target point as the basic backbone network.

In some alternative implementations of the present embodiment, the obtaining module includes: an acquiring submodule configured to acquire a target network, where the target network includes at least one of the following items: an activation function or a fully connected layer; and an obtaining submodule configured to add the target network to the basic backbone network to obtain the target backbone network.

In some alternative implementations of the present embodiment, the apparatus 600 for generating a backbone network further includes: an updating module configured to update a convolution kernel size of the target backbone network.

In some alternative implementations of the present embodiment, the apparatus 600 for generating a backbone network further includes: an adding module configured to add a Squeeze-and-Excitation module to a predetermined target adding position in the target backbone network to obtain a final backbone network.

In some alternative implementations of the present embodiment, the target adding position is determined through the following steps of: adding the SE module to different positions in the target backbone network to obtain a corresponding set of first backbone networks; inferring, for each first backbone network in the set of the first backbone networks, the set of the inference image by using each first backbone network, to obtain an inference time and an inference accuracy of each first backbone network in an inference process; and determining the target adding position based on the inference time and the inference accuracy of each first backbone network in the inference process.

In some alternative implementations of the present embodiment, the set of the initial backbone network includes at least one initial backbone network; and the initial backbone network is obtained through the following steps of: acquiring a network block of a lightweight backbone network to obtain a set of the network block; and randomly combining the network block in the set of the network block to obtain the initial backbone network.

Figure 7:
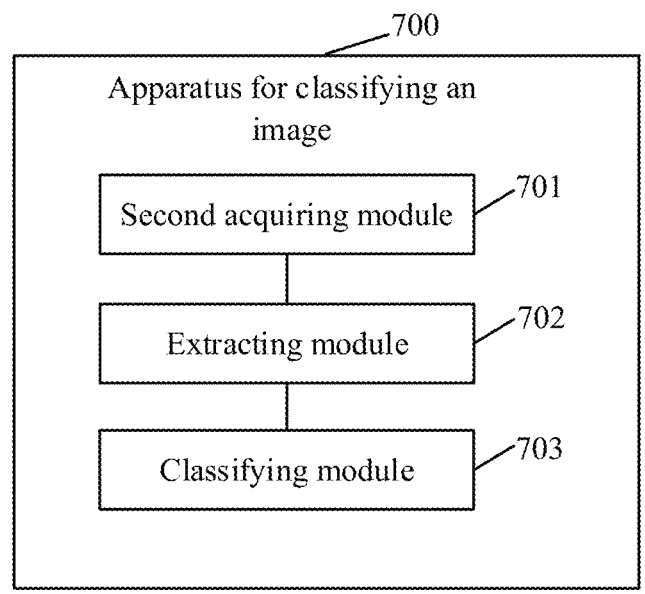
FIG. 7 is a schematic structural diagram of an apparatus for classifying an image according to an embodiment of the present disclosure.

Further referring to FIG. 7, as an implementation of the method shown in the above figures, an embodiment of the present disclosure provides an apparatus for classifying an image. The embodiment of the apparatus corresponds to the embodiment of the method shown in FIG. 5, and the apparatus may be specifically applied to various electronic devices.

As shown in FIG. 7, the apparatus 700 for classifying an image of the present embodiment includes: a second acquiring module 701, an extracting module 702, and a classifying module 703. The second acquiring module 701 is configured to acquire a to-be-classified image; the extracting module 702 is configured to extract a feature of the to-be-classified image by using a pre-generated backbone network to obtain an image feature; and the classifying module 703 is configured to classify the image feature to obtain a classification result.

The related description of steps 501 to 503 in the corresponding embodiment of FIG. 5 may be referred to for specific processing of the second acquiring module 701, the extracting module 702, and the classifying module 703 of the apparatus 700 for classifying an image in the present embodiment and the technical effects thereof, respectively. The description will not be repeated here.

According to an embodiment of the present disclosure, the present disclosure further provides an electronic device, a readable storage medium, and a computer program product.

Figure 8:
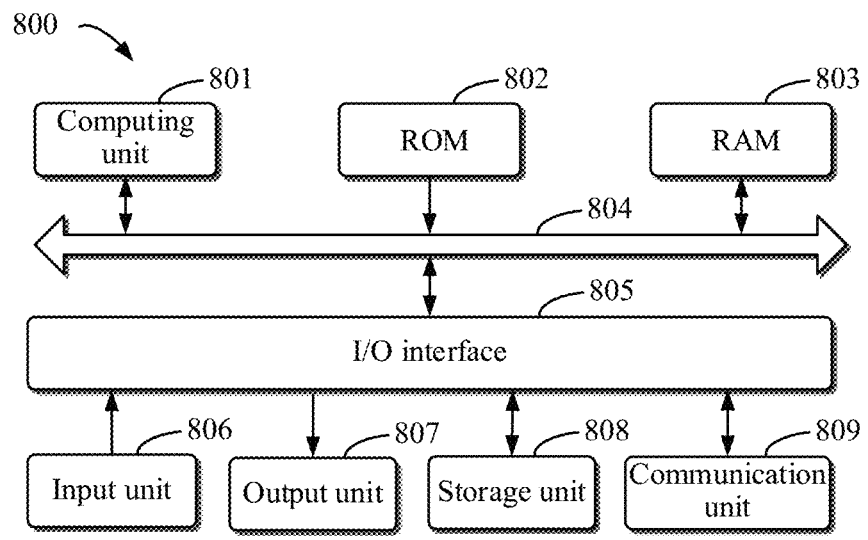
FIG. 8 is a block diagram of an electronic device configured to implement the method for generating a backbone network or the method for classifying an image of embodiments of the present disclosure.

FIG. 8 shows a schematic block diagram of an example electronic device 800 that may be configured to implement embodiments of the present disclosure. The electronic device is intended to represent various forms of digital computers, such as a laptop computer, a desktop computer, a workbench, a personal digital assistant, a server, a blade server, a mainframe computer, and other suitable computers. The electronic device may alternatively represent various forms of mobile apparatuses, such as a personal digital assistant, a cellular phone, a smart phone, a wearable device, and other similar computing apparatuses. The components shown herein, the connections and relationships thereof, and the functions thereof are used as examples only, and are not intended to limit implementations of the present disclosure described and/or claimed herein.

As shown in FIG. 8, the device 800 includes a computing unit 801, which may execute various appropriate actions and processes in accordance with a computer program stored in a read-only memory (ROM) 802 or a computer program loaded into a random access memory (RAM) 803 from a storage unit 808. The RAM 803 may further store various programs and data required by operations of the device 800. The computing unit 801, the ROM 802, and the RAM 803 are connected to each other through a bus 804. An input/output (I/O) interface 805 is also connected to the bus 804.

A plurality of components in the device 800 is connected to the I/O interface 805, including: an input unit 806, such as a keyboard and a mouse; an output unit 807, such as various types of displays and speakers; a storage unit 808, such as a magnetic disk and an optical disk; and a communication unit 809, such as a network card, a modem, and a wireless communication transceiver. The communication unit 809 allows the device 800 to exchange information/data with other devices through a computer network such as the Internet and/or various telecommunication networks.

The computing unit 801 may be various general purpose and/or specific purpose processing components having a processing capability and a computing capability. Some examples of the computing unit 801 include, but are not limited to, a central processing unit (CPU), a graphics processing unit (GPU), various specific purpose artificial intelligence (AI) computing chips, various computing units running a machine learning model algorithm, a digital signal processor (DSP), and any appropriate processor, controller, micro-controller, and the like. The computing unit 801 executes various methods and processes described above, such as the method for generating a backbone network or the method for classifying an image. For example, in some embodiments, the method for generating a backbone network or the method for classifying an image may be implemented as a computer software program that is tangibly included in a machine readable medium, such as the storage unit 808. In some embodiments, some or all of the computer programs may be loaded and/or installed onto the device 800 via the ROM 802 and/or the communication unit 809. When the computer program is loaded into the RAM 803 and executed by the computing unit 801, one or more steps of the method for generating a backbone network or the method for classifying an image described above may be executed. Alternatively, in other embodiments, the computing unit 801 may be configured to execute the method for generating a backbone network or the method for classifying an image by any other appropriate approach (e.g., by means of firmware).

Various implementations of the systems and technologies described above herein may be implemented in a digital electronic circuit system, an integrated circuit system, a field programmable gate array (FPGA), an application specific integrated circuit (ASIC), an application specific standard product (ASSP), a system on a chip (SOC), a complex programmable logic device (CPLD), computer hardware, firmware, software, and/or a combination thereof. The various implementations may include: being implemented in one or more computer programs, where the one or more computer programs may be executed and/or interpreted on a programmable system including at least one programmable processor, and the programmable processor may be a specific-purpose or general-purpose programmable processor, which may receive data and instructions from a storage system, at least one input apparatus and at least one output apparatus, and send the data and instructions to the storage system, the at least one input apparatus and the at least one output apparatus.

Program codes for implementing the method of the present disclosure may be compiled using any combination of one or more programming languages. The program codes may be provided to a processor or controller of a general purpose computer, a specific purpose computer, or other programmable apparatuses for data processing, such that the program codes, when executed by the processor or controller, cause the functions/operations specified in the flowcharts and/or block diagrams to be implemented. The program codes may be completely executed on a machine, partially executed on a machine, partially executed on a machine and partially executed on a remote machine as a separate software package, or completely executed on a remote machine or server.

In the context of some embodiments of the present disclosure, a machine readable medium may be a tangible medium which may contain or store a program for use by, or used in combination with, an instruction execution system, apparatus or device. The machine readable medium may be a machine readable signal medium or a machine readable storage medium. The computer readable medium may include, but is not limited to, electronic, magnetic, optical, electromagnetic, infrared, or semiconductor systems, apparatuses, or devices, or any appropriate combination of the above. A more specific example of the machine readable storage medium will include an electrical connection based on one or more pieces of wire, a portable computer disk, a hard disk, a random access memory (RAM), a read only memory (ROM), an erasable programmable read only memory (EPROM or flash memory), an optical fiber, a portable compact disk read only memory (CD-ROM), an optical storage device, a magnetic storage device, or any appropriate combination of the above.

To provide interaction with a user, the systems and technologies described herein may be implemented on a computer that is provided with: a display apparatus (e.g., a CRT (cathode ray tube) or an LCD (liquid crystal display) monitor) configured to display information to the user; and a keyboard and a pointing apparatus (e.g., a mouse or a trackball) by which the user can provide an input to the computer. Other kinds of apparatuses may also be configured to provide interaction with the user. For example, feedback provided to the user may be any form of sensory feedback (e.g., visual feedback, auditory feedback, or tactile feedback); and an input may be received from the user in any form (including an acoustic input, a voice input, or a tactile input).

The systems and technologies described herein may be implemented in a computing system that includes a back-end component (e.g., as a data server), or a computing system that includes a middleware component (e.g., an application server), or a computing system that includes a front-end component (e.g., a user computer with a graphical user interface or a web browser through which the user can interact with an implementation of the systems and technologies described herein), or a computing system that includes any combination of such a back-end component, such a middleware component, or such a front-end component. The components of the system may be interconnected by digital data communication (e.g., a communication network) in any form or medium. Examples of the communication network include: a local area network (LAN), a wide area network (WAN), and the Internet.

The computer system may include a client and a server. The client and the server are generally remote from each other, and generally interact with each other through a communication network. The relationship between the client and the server is generated by virtue of computer programs that run on corresponding computers and have a client-server relationship with each other. The server may be a cloud server, or a server of a distributed system, or a server combined with a blockchain.

It should be understood that the various forms of processes shown above may be used to reorder, add, or delete steps. For example, the steps disclosed in some embodiments of the present disclosure may be executed in parallel, sequentially, or in different orders, as long as the desired results of the technical solutions mentioned in some embodiments of the present disclosure can be implemented. This is not limited herein.

The above specific implementations do not constitute any limitation to the scope of protection of the present disclosure. It should be understood by those skilled in the art that various modifications, combinations, sub-combinations, and replacements may be made according to the design requirements and other factors. Any modification, equivalent replacement, improvement, and the like made within the spirit and principle of the present disclosure should be encompassed within the scope of protection of the present disclosure.

What is claimed is:

1. A method for generating a backbone network, comprising:
    acquiring a set of training images, a set of inference images, and a set of initial backbone networks;
    training and inferring, for each initial backbone network in the set of initial backbone networks, using the set of training images and the set of inference images to obtain an inference time and an inference accuracy of a trained backbone network in an inference process, wherein training and inferring, for each initial backbone network in the set of initial backbone networks, comprises:
        training an initial backbone network by using the set of training images to obtain the trained backbone network, and
        converting the trained backbone network into an inference network, inferring the set of inference images by using the inference network, and obtaining the inference time and the inference accuracy of the inference network in the inference process, wherein the inference time is a time used for inferring the set of inference images by using the inference network, and the inference accuracy is an accuracy of an inference result of the inference network; and
    determining a basic backbone network based on the inference time and the inference accuracy of the trained backbone network in the inference process, wherein determining the basic backbone network comprises:
        determining, based on the inference accuracy and the inference time of each inference network converted from the set of initial backbone networks, the basic backbone network from the set of initial backbone networks; and
        obtaining a target backbone network based on the basic backbone network and a preset target network.

2. The method according to claim 1, wherein the determining, based on the inference time and the inference accuracy of each inference network converted from the set of initial backbone networks, the basic backbone network from the set of initial backbone networks comprises:
    plotting inference times and inference accuracies of the set of initial backbone networks in the inference process as points in a two-dimensional coordinate system; and
    determining a target point from the points in the two-dimensional coordinate system, and determining an initial backbone network of the set of initial backbone networks corresponding to the target point as the basic backbone network.

3. The method according to claim 1, wherein the obtaining the target backbone network based on the basic backbone network and the preset target network comprises:
    acquiring a target network, wherein the target network comprises at least one of an activation function or a fully connected layer; and
    adding the target network to the basic backbone network to obtain the target backbone network.

4. The method according to claim 1, wherein the method further comprises:
    updating a convolution kernel size of the target backbone network.

5. The method according to claim 1, wherein the method further comprises:
    adding a Squeeze-and-Excitation module to a predetermined target adding position in the target backbone network to obtain a final backbone network.

6. The method according to claim 5, wherein the predetermined target adding position is determined through following steps of:
    adding the Squeeze-and-Excitation module to different positions in the target backbone network to obtain a corresponding set of first backbone networks;
    inferring, for each first backbone network in the corresponding set of first backbone networks, the set of inference images by using the corresponding set of first backbone networks to obtain an inference time and an inference accuracy of each first backbone network in an inference process; and
    determining the predetermined target adding position based on the inference time and the inference accuracy of each first backbone network in the inference process.

7. The method according to claim 1, wherein the set of initial backbone networks comprises at least one initial backbone network; and
    the initial backbone network is obtained through following steps of:
    acquiring a network block of a lightweight backbone network to obtain a set of the network block; and
    randomly combining the network block in the set of the network block to obtain the initial backbone network.

8. The method according to claim 1, wherein the method further comprises:
    acquiring a to-be-classified image;
    extracting a feature of the to-be-classified image by using the target backbone network to obtain an image feature; and
    classifying the image feature to obtain a classification result.

9. An electronic device, comprising:
    at least one processor; and
    a memory communicatively connected to the at least one processor; wherein
    the memory stores instructions executable by the at least one processor, and the instructions, when executed by the at least one processor, cause the at least one processor to perform operations comprising:
    acquiring a set of training images, a set of inference images, and a set of initial backbone networks;
    training and inferring, for each initial backbone network in the set of initial backbone networks, using the set of training images and the set of inference images to obtain an inference time and an inference accuracy of a trained backbone network in an inference process, wherein training and inferring for each initial backbone network in the set of initial backbone networks comprises:
        training an initial backbone network by using the set of training images to obtain the trained backbone network, and
        converting the trained backbone network into an inference network, inferring the set of inference images by using the inference network, and obtaining the inference time and the inference accuracy of the inference network in the inference process, wherein the inference time is a time used for inferring the set of inference images by using the inference network, and the inference accuracy is an accuracy of an inference result of the inference network; and
    determining a basic backbone network based on the inference time and the inference accuracy of the trained backbone network in the inference process, wherein determining the basic backbone network comprises:

determining, based on inference accuracy and inference time of each inference network converted from the set of initial backbone networks, the basic backbone network from the set of initial backbone networks; and obtaining a target backbone network based on the basic backbone network and a preset target network.

10. The electronic device according to claim 9, wherein the determining, based on the inference time and the inference accuracy of each inference network converted from the set of initial backbone networks, the basic backbone network from the set of initial backbone networks comprises:

plotting inference times and inference accuracies of the set of initial backbone networks in the inference process as points in a two-dimensional coordinate system; and determining a target point from the points in the two-dimensional coordinate system, and determining an initial backbone network of the set of initial backbone networks corresponding to the target point as the basic backbone network.

11. The electronic device according to claim 9, wherein the obtaining the target backbone network based on the basic backbone network and the preset target network comprises:

acquiring a target network, wherein the target network comprises at least one of an activation function or a fully connected layer; and adding the target network to the basic backbone network to obtain the target backbone network.

12. The electronic device according to claim 9, wherein the operations further comprise:

updating a convolution kernel size of the target backbone network.

13. The electronic device according to claim 9, wherein the operations further comprise:

adding a Squeeze-and-Excitation module to a predetermined target adding position in the target backbone network to obtain a final backbone network.

14. The electronic device according to claim 13, wherein the predetermined target adding position is determined through following steps of:

adding the Squeeze-and-Excitation module to different positions in the target backbone network to obtain a corresponding set of first backbone networks;

inferring, for each first backbone network in the corresponding set of first backbone networks, the set of inference images by using the corresponding set of first backbone networks to obtain an inference time and an inference accuracy of each first backbone network in an inference process; and determining the predetermined target adding position based on the inference time and the inference accuracy of each first backbone network in the inference process.

15. The electronic device according to claim 9, wherein the set of initial backbone networks comprises at least one initial backbone network; and the initial backbone network is obtained through following steps of:

acquiring a network block of a lightweight backbone network to obtain a set of the network block; and randomly combining the network block in the set of the network block to obtain the initial backbone network.

16. The electronic device according to claim 9, wherein the operations further comprise:

acquiring a to-be-classified image;

extracting a feature of the to-be-classified image by using the target backbone network to obtain an image feature; and classifying the image feature to obtain a classification result.

17. A non-transitory computer readable storage medium storing computer instructions, wherein the computer instructions cause a computer to perform operations comprising:

acquiring a set of training images, a set of inference images, and a set of initial backbone networks;

training and inferring, for each initial backbone network in the set of initial backbone networks, using the set of training images and the set of inference images to obtain an inference time and an inference accuracy of a trained backbone network in an inference process, wherein training and inferring for each initial backbone network in the set of initial backbone networks comprises:

training an initial backbone network by using the set of training images to obtain the trained backbone network, and converting the trained backbone network into an inference network, inferring the set of inference images by using the inference network, and obtaining the inference time and the inference accuracy of the inference network in the inference process, wherein the inference time is a time used for inferring the set of inference images by using the inference network, and the inference accuracy is an accuracy of an inference result of the inference network;

determining a basic backbone network based on the inference time and the inference accuracy of the trained backbone network in the inference process, wherein determining the basic backbone network comprises:

determining, based on inference accuracy and inference time of each inference network converted from the set of initial backbone networks, the basic backbone network from the set of initial backbone networks; and obtaining a target backbone network based on the basic backbone network and a preset target network.

18. The storage medium according to claim 17, wherein the operations further comprise:

acquiring a to-be-classified image;

extracting a feature of the to-be-classified image by using the target backbone network to obtain an image feature; and classifying the image feature to obtain a classification result.

* * * * *